(12) United States Patent  (10) Patent No.: US 6,659,929 B1
Jaksch  (45) Date of Patent: Dec. 9, 2003

(54) TABBER APPARATUS AND METHOD (76) Inventor: John H. Jaksch, 1308 Hollywood Ave., Glenview, IL (US) 60025-2224

( * ) Notice: Subject to any disclaimer, the term of this patent is extended or adjusted under 35 U.S.C. 154(b) by 0 days.

(21) Appl. No.: 09/523,400

(22) Filed: Mar. 10, 2000

Related U.S. Application Data

(62) Division of application No. 09/110,093, filed on Jul. 2, 1998, now Pat. No. 6,090,034.

(51) Int. Cl.[7] .................................................. B31B 1/90
(52) U.S. Cl. ........................ 493/375; 493/376; 493/382
(58) Field of Search ................................. 493/375, 374, 493/376, 382; 53/389.1, 389.2; 242/243, 285, 290

(56) References Cited

U.S. PATENT DOCUMENTS

| | | | | |
|---|---|---|---|---|
| 3,540,969 A | * | 11/1970 | Jorgensen | 156/523 |
| 4,411,644 A | * | 10/1983 | Tinklenberg | 493/213 |
| 4,905,927 A | * | 3/1990 | Lesse | |
| 5,294,100 A | * | 3/1994 | Scheibelhut | |
| 5,609,147 A | * | 3/1997 | Withorn, Jr. | |
| 5,849,419 A | * | 12/1998 | Josephy et al. | 428/516 |
| 6,224,527 B1 | * | 5/2001 | Pinchin et al. | |
| 6,267,713 B1 | * | 7/2001 | Jaksch | |
| 6,382,542 B1 | * | 5/2002 | Sato | |

* cited by examiner

Primary Examiner—Eugene Kim
(74) Attorney, Agent, or Firm—Cardinal Law Group (57) ABSTRACT

A tabber apparatus includes a frame, a friction drive roller rotatably and operatively connected to the frame, and a take-up spool rotatably and operatively connected to the frame and operatively connected to the friction drive roller to allow backing paper which is wrapped about a portion of the friction drive roller to be taken up into the take-up spool. The tabber further includes a slick tab drive roller to provide proper placement of the tab on the media, a tab brake including a roller positionable between a first and second position to rotate a tab reel spindle, and a tab and media sensor operatively connected to a microcontroller to activate and deactivate a tab dispensing motor. Moreover, the tabber apparatus further includes removable upper shafts which are retained by spring-loaded retaining members which fit into grooves on the shafts.

10 Claims, 10 Drawing Sheets

TABBER APPARATUS AND METHOD

This application is a division of application Ser. No. 09/110,093, filed Jul. 2, 1998 now U.S. Pat. No. 6,090,034, pending

FIELD OF THE INVENTION

The invention generally relates to the field of tabbing machines which seal an open edge of folded or multipage media with adhesive backed tabs.

BACKGROUND OF THE INVENTION

In general, tabbing machines are used to affix adhesive backed tabs over the open edges of media, which are commonly used in bulk rate mailers. Typically, these tabbing machines include rollers which feed a single form or media from the bottom of a stack of media with driven rollers toward a tab dispensing area. The open edge of the media is driven against the tab and the tab is folded over the open edge and onto the sides of the media with additional rollers.

One problem encountered with such tabbing machines results from the variable pressure sensitivity of the rolls of adhesive backed tabs due to, for example, the age of the tabs and other physical properties. These tabbing machines may not be capable of dispensing a wide variety of shapes and sizes of tabs which are necessary for the wide variety or shapes and sizes media. It is also important to properly place the tab over the edge so that the tab is preferably secured equally to each side of the media. It would be desirable to have a tabbing machine which could be easily adjusted to take into account the pressure sensitivity of the tabs, the size of the tabs, and the positioning of the tabs on the media.

Another problem encountered in existing tabbing machines is the tendency of the opposing rollers, which are used to fold the tab and which are typically made of rubber or plastic, to grip the tab prior to the tab entering a nip region between the opposing rollers. This gripping action may result in the improper placement of the tab on the media. It would be desirable to have a folding roller system which prevents such gripping.

Existing tabbing systems may also include roller shafts which are permanently attached to the frame, and accordingly make it difficult to clear jams. In addition, roller pairs are used to take-up the backing paper when dispensing a tab. Moreover, existing tabbing systems have inefficiencies due to the additional horsepower necessary to drive the variable load of tabs on the tab reel. These systems must be sized with motors and tab reel brakes to handle the condition when the tab reel has a full load, for example, a roll of 5000 tabs. Accordingly, it would be desirable to have an efficient, low-cost system which solves the problems described above.

SUMMARY OF THE INVENTION

One aspect of the invention provides a tabber apparatus comprising of a frame, friction drive roller rotatably and operatively connected to the frame, a take-up spool rotatably and operatively connected to the frame and operatively connected to the friction drive roller to allow backing paper which is wrapped about a portion of the friction drive roller to be taken up onto the the take-up spool. The apparatus may further comprise a guide post positioned to allow the portion of the friction drive roller to be wrapped with the backing paper. The wrap may cover at least about 60 degrees of the friction drive roller and preferably 100 to 180 degrees of the friction drive roller. The friction drive roller preferably comprises a sponge-like material, for example, neoprene. The apparatus may further include a tab folding roller assembly comprising a tab drive roller made of a slick material, for example, aluminum.

A further aspect of the invention provides a method of operating a tabber apparatus. A friction drive roller rotatably and operatively connected to the frame, and a take-up spool rotatably and operatively connected to the frame and operatively connected to the friction drive roller are provided. The backing paper is wrapped around a portion of the friction drive roller. The friction drive roller is rotated. The take-up spool is rotated, and the backing paper is taken up on the take-up spool. The backing paper may be wrapped preferably between at least about 100–180 degrees around the friction drive roller. A peel plate may be provided, and the backing paper may be pulled a first distance around the peel plate to partially peel one adhesive back tab from the backing paper. The friction drive roller may be rotated to pull the backing paper a first distance. The take-up spool may be rotated more than the first distance to provide tension in the backing paper. A tab folder roller assembly including a tab drive roller with a slick surface may be also provided. A leading edge of a form may contact the adhesive back tab so that the tab is gripped in a nip region formed between the slick tab drive roller and a tab pressure roller.

A further aspect of the invention provides a tabber apparatus comprising a frame, a tab reel spindle rotatably connected to the frame, a brake member including a brake link rotatably attached to the frame at an axis point, and a roller rotatably attached to the brake link, wherein the roller is rotated from a first position to a second position about the axis point when a tab is dispensed, and returns to the first position while pulling a backing paper from the tab reel spindle. Preferably, a brake link O-ring positioned around the brake link adjacent an end of the brake link allows the brake link O-ring to press against the spindle when in the first position. A spindle O-ring may also be preferably positioned around the spindle so that the spindle O-ring contacts with the brake link O-ring when in the first position. Preferably, the brake link has a length and the roller has a weight sufficient to allow the brake member to stop the spindle from rotating when the roller is in the first position, and to rotate the spindle when rotating the roller from the second position to the first position. Preferably, the first position of the roller is lower than the second position of the roller. A further aspect of the invention provides a method of operating a tabber apparatus. A frame, a reel spindle rotatably connected to the frame, a brake member including a brake link rotatably attached to the frame at an axis point, and a roller rotatably attached to the brake link are provided. The brake link member is rotated about the axis to move the roller from a first position to a second position when a tab is dispensed. The brake member is rotated to move the roller back to the second position. The backing paper is pulled from the tab reel spindle with the roller as it moves from the second position to the first position. A first end of the brake link is preferably pressed against the spindle when the roller is in the first position to stop rotation of the spindle. A first O-ring is preferably positioned around the brake link and a second O-ring is preferably positioned around the spindle. The first and second O-rings contact each other to stop the spindle from rotating when the roller is in the first position.

A further aspect of the invention provides a tabber apparatus comprising a frame including a top panel, the top panel including a media sensor opening and a tab sensor opening formed therein, a media sensor positioned adjacent the media sensor opening, a microcontroller operatively connected to the media sensor and to the tab sensor, and a motor operatively connected to the microcontroller wherein the microcontroller receives signals from the media sensor and tab sensor and activates and deactivates the motor to dispense tabs. Preferably, the tab sensor and media sensor are reflective, modulated optical sensors. Preferably, the media sensor is positioned up stream of the tab sensor. The apparatus may further comprise EEPROM operatively connected to the microcontroller to allow input by an operator to control the amount of tab peel.

A further aspect of the invention provides a method of operating a tabber apparatus. A frame including a top panel is provided. The top panel includes a media sensor opening and a tab sensor opening formed therein. The media sensor is positioned adjacent the media sensor opening and the tab sensor is positioned adjacent the tab sensor opening. A microcontroller is operatively connected to the media sensor and the tab sensor, and a motor is operatively connected to the microcontroller. Signals sent by the media sensor and tab sensor are received by the microcontroller. The motor is activated and deactivated to dispense tabs in timed sequence. Upon receipt of a signal by the microcontroller from the media sensor, a tab may be partially peeled from a backing paper. The tab dispense may be completed upon sending a signal from the tab sensor to the microcontroller. EEPROM may be operatively connected to the microcontroller. The amount of peel may be controlled by programming the time of motor activation. A first media may be transported toward a first tab which is fully dispensed. The media sensor is then blocked with the first media. A delay timer for a pre-dispense cycle is then started. The first tab is then pulled from the backing paper. The tab sensor is then blocked with reflective light from the first media. A pre-dispense cycle of a second tab is started. The media sensor and tab sensor are unblocked as a trailing edge of the first media clears the sensor openings. The dispense cycle of the second tab is started by turning on the motor. The tab sensor is then blocked with the second tab and the motor is then stopped.

A further aspect of the invention provides a tabber apparatus comprising a frame including at least one opening formed therein, a removable shaft including an end received in the opening, a retaining member including a body portion and a first arm portion rotatably attached to the frame, and a second portion biased to allow contact of the body portion against the shaft to retain the shaft in the opening. The shaft preferably includes a notch formed therein to receive the body portion of the retaining member. The second arm portion may be biased with a spring, which is attached at a first end to the second arm portion and at a second end to the frame. Preferably, a retaining member may contact the shaft adjacent both of the shaft ends. The frame may also include openings wherein the first and second arm portions extend through the openings. The arm portions may include openings therein to allow insertion of a locking pin.

A further aspect of the invention provides a method of operating a tabber apparatus. A frame including at least one opening formed therein, a removable shaft including an end received in the opening, and a retaining member including a body portion and first and second arm portions, with the first arm portion rotatably attached to the frame, is provided. The second arm portion is biased. The body portion is contacted against the shaft. The shaft is retained within the opening. The body portion may be biased against the shaft by use of a spring attached to the second arm and to the frame. The body portion may be received in a notch formed in the shaft. The retaining member may be rotated about the first arm portion to remove the shaft from the opening.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
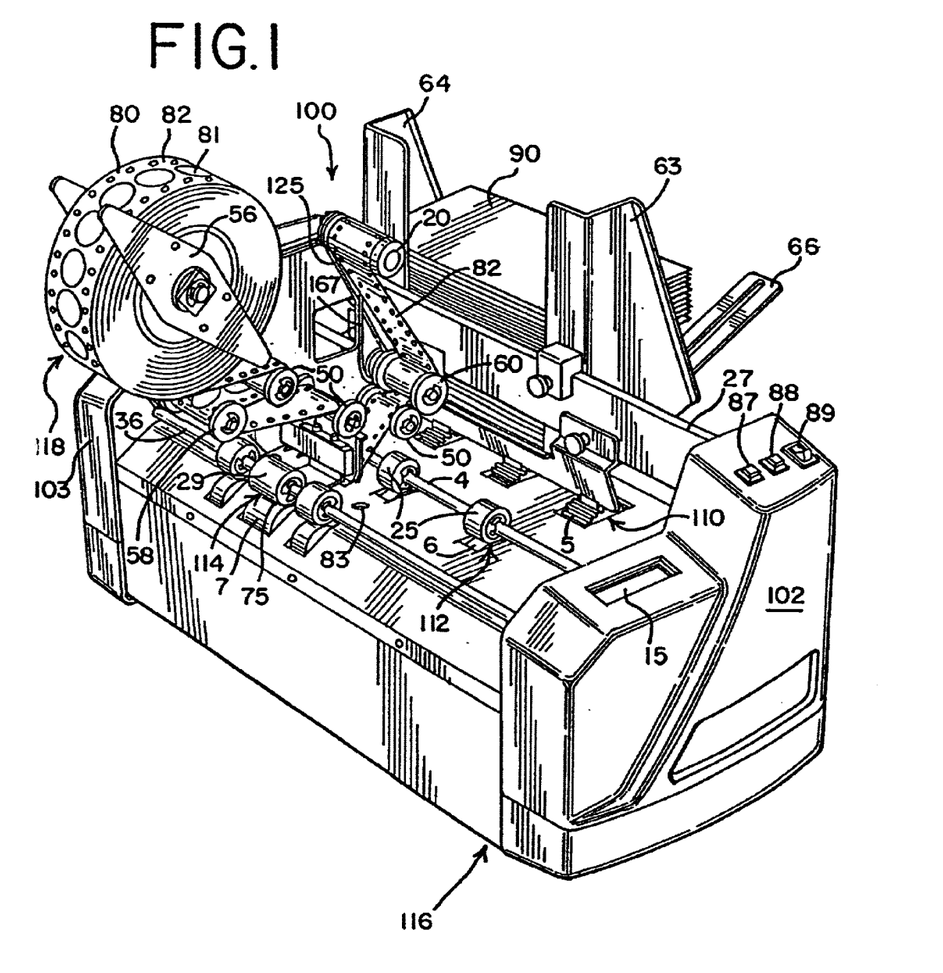
FIG. 1 is a preferred embodiment of a tabber apparatus made in accordance with the invention.
Figure 2:
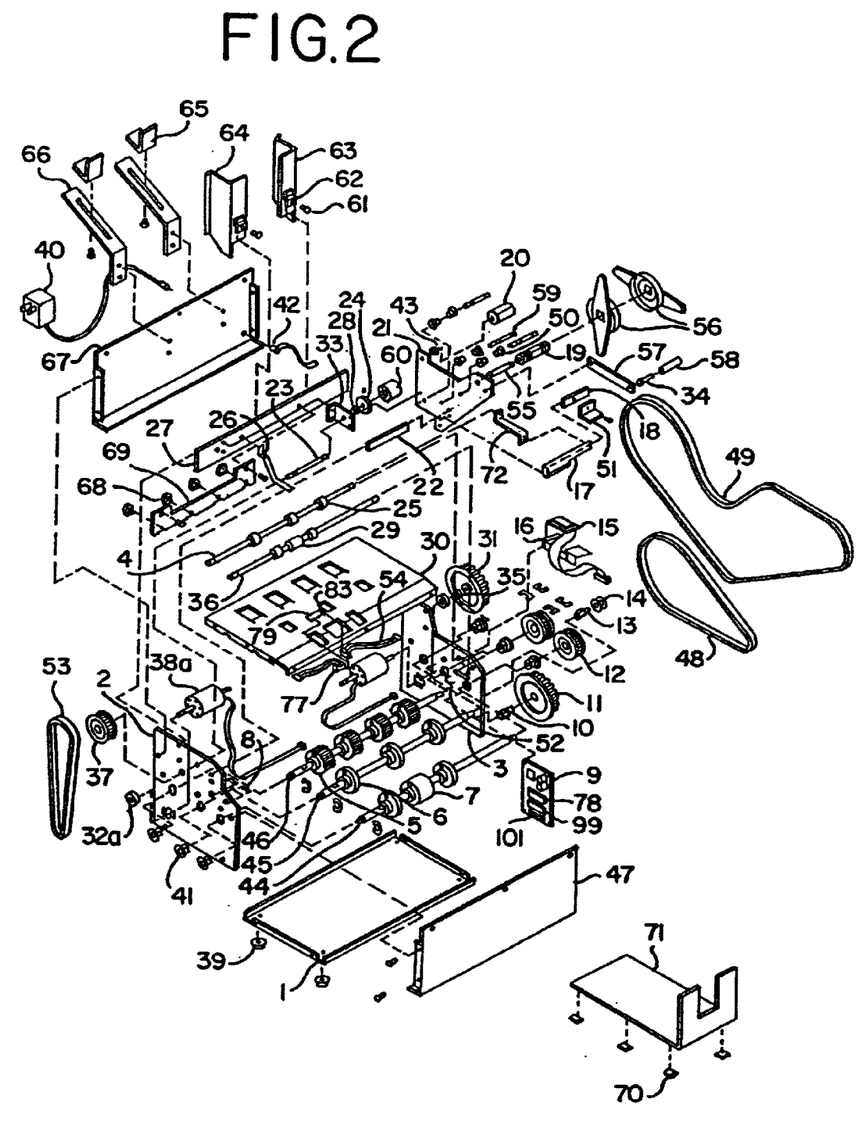
FIG. 2 is a partial exploded view of a preferred embodiment of a tabber apparatus made in accordance with the invention.
Figure 3:
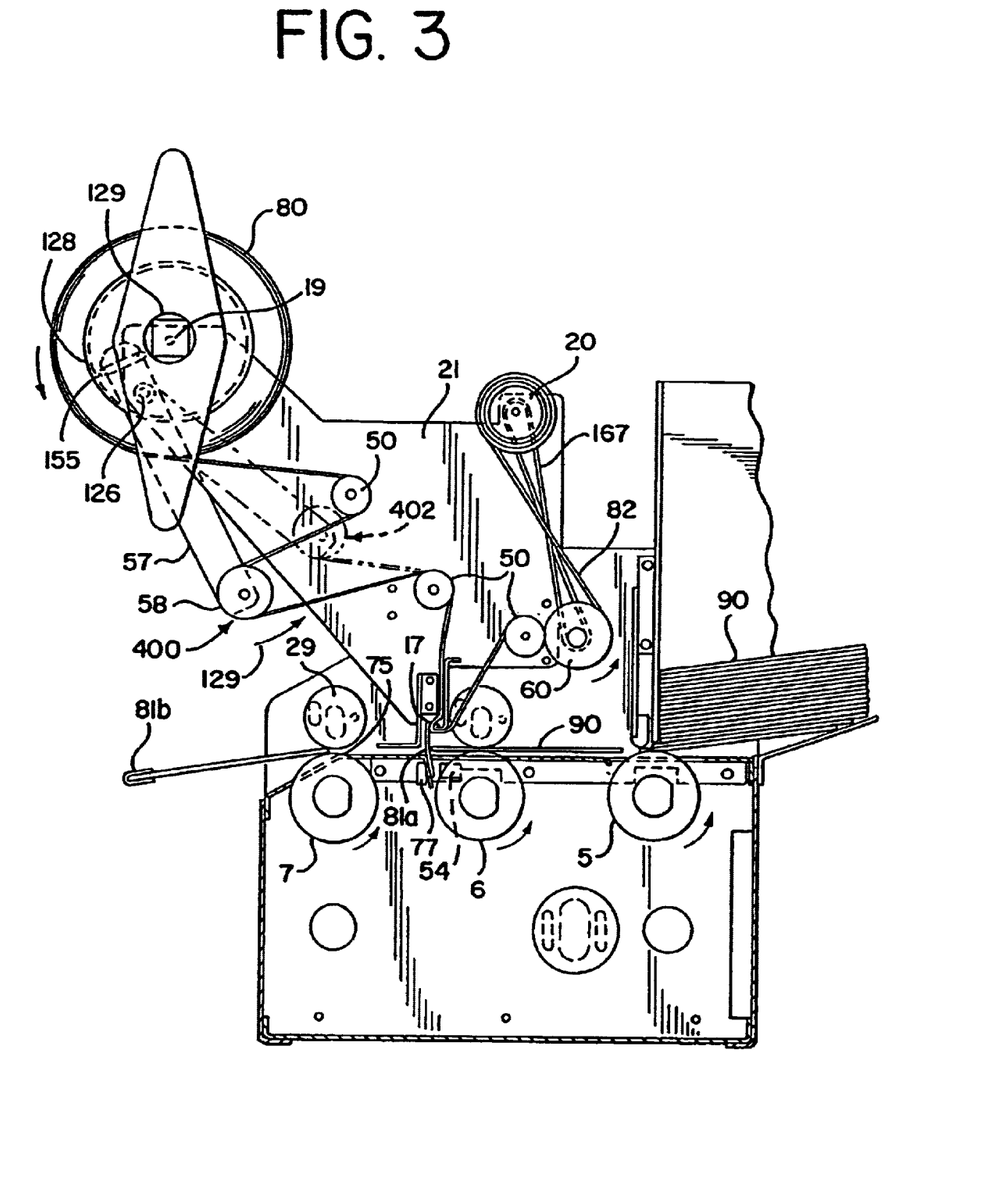
FIG. 3 is a sectional view of a preferred embodiment of a tabber apparatus in operation.

Referring to FIGS. 1–3, a preferred embodiment of the tabber apparatus 100 includes a feed roller assembly 110, a drive roller assembly 112, and a tab folding roller assembly 114, each of which is operatively connected to housing 116. Media 90 is transported by the feed roller assembly 110 to the drive roller assembly 112. Tabs 81 are rotated into position and partially peeled from the backing paper 82 by the tab dispensing assembly 118. The drive roller assembly 112 forces the media 90 into the partially peeled tab 81a. Media 90 is carried into the folding roller assembly 114 where the tab 81b is secured to the media and the media 90 exits from the tabber apparatus 100. A preferred embodiment of the tabber apparatus is, for example, the EX5100 Express Tabber, available from Martin Yale Industries, Inc., Wabash, Ind. 46992.

Figure 4:
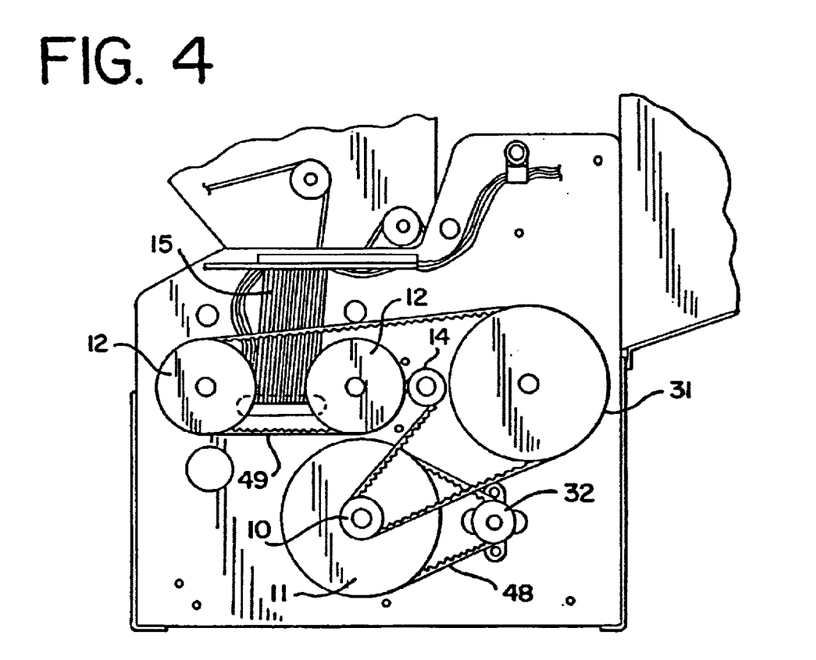
FIG. 4 is the roller drive side of a preferred embodiment of a tabber apparatus made in accordance with the invention.
Figure 5:
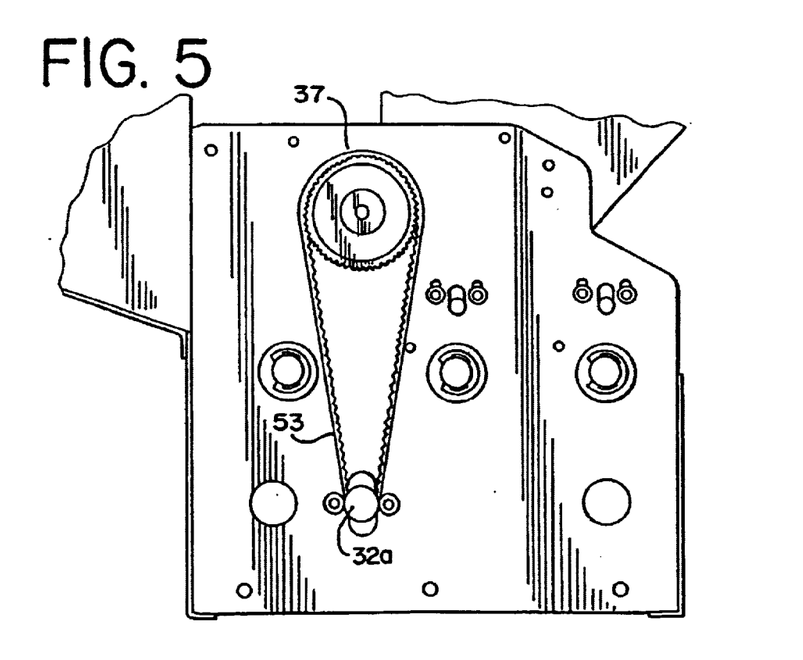
FIG. 5 is the media drive side of a preferred embodiment of a tabber apparatus made in accordance with the invention.

Referring to FIGS. 1, 2 and 4, the feed roller assembly 110 preferably includes a plurality of spaced apart feed rollers 5 which are attached to feeder shaft 46. Preferably, the feed rollers 5 are grooved to facilitate the transport of the media 90. The feeder shaft 46 is preferably made of steel, and the feed rollers 5 are preferably made of rubber, or rubber-like material. The drive roller assembly 112 preferably includes a drive shaft 45 having a plurality of spaced apart drive rollers 6, and a removable upper mid-shaft 4 having spaced apart drive pressure rollers 25. The drive shaft 45 and upper mid-shaft 4 are preferably made of steel, the drive rollers 6 are preferably made of a rubber-like material, and the drive pressure rollers 25 are preferably made of plastic. The exit shaft 44 and upper exit shaft 36 are preferably made of steel, and the tab rollers 6 are made of rubber-like material. The folding roller assembly 114 preferably includes an exit shaft 44 having a tab drive roller 7 positioned between and spaced apart from a pair of drive rollers 6, and a removable upper exit shaft 36 having a tab pressure roller 29 attached between and spaced apart from a pair of drive pressure rollers 25. The tab drive roller 7 is preferably made of a material having a slick surface with a low co-efficient of friction such as, for example, aluminum. The slick surface prevents the tab 81 from being prematurely gripped prior to entering the nip region 75 between the tab pressure roller 29 and tab drive roller 7. The feed shaft 46 is driven by an electric drive motor 38 through a media drive motor pulley 32, a timing belt 48, a combo pulley 11, a timing belt 49, and a feed drive pulley 31, which is connected to the feeder shaft 46. A suitable motor 38 may be, for example, a 24 Volt DC Motor. For example, the timing belt 48 may be a 95T Timing Belt, the timing belt 49 may be a 211T Timing Belt, the media drive motor pulley 32 may a 10T Motor Pulley, and the feed drive pulley 31 may be a 72T Feed Drive Pulley. Media drive pulleys 12 are driven by a timing belt 49 and an idler pulley 14 at an increased speed to the feed drive pulley 31. One of the media drive pulleys 12 is attached to the drive shaft 45 and another media drive pulley 12 is attached to the exit shaft 44. The media drive pulley 12 may, for example, be a 40T Media Drive Pulley. Accordingly, when the form or media 90 contacts the drive roller assembly 112, each form is spaced from the trailing form to allow adequate time for the tab dispensing and tab folding functions.

Figure 11:
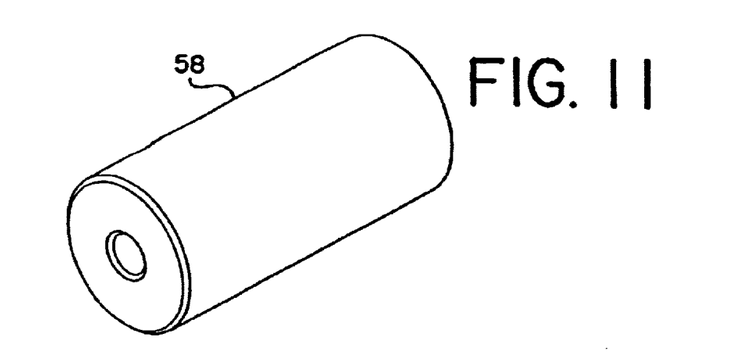
FIG. 11 is a perspective view of a preferred embodiment of a brake roller.
Figure 12:
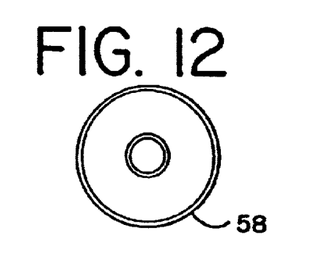
FIG. 12 is an end view of the brake roller of FIG. 11.
Figure 13:
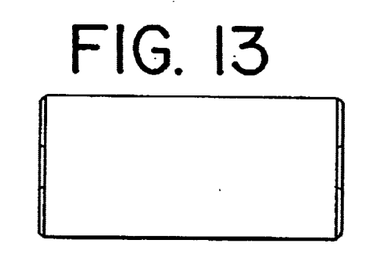
FIG. 13 is a plan view of the brake roller of FIG. 11.
Figure 14:
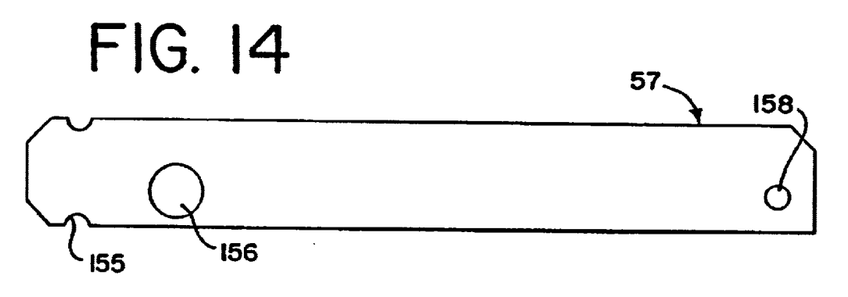
FIG. 14 is a front view of a preferred embodiment of a tab reel brake link.
Figure 15:
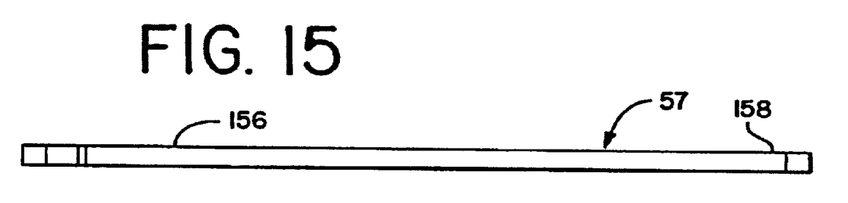
FIG. 15 is a side view of the tab reel brake link of FIG. 14.
Figures 16, 17, 18, 19:
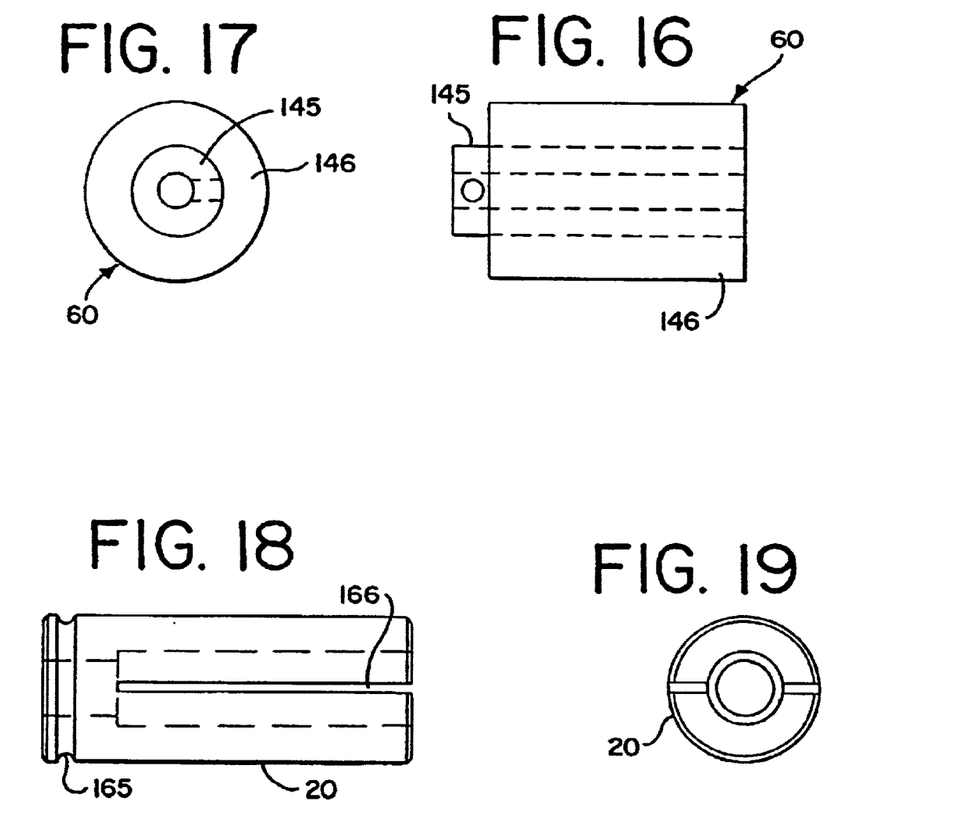
FIG. 16 is a side view of a preferred embodiment of a friction drive roller.
FIG. 17 is an end view of the friction drive roller of FIG. 16.
FIG. 18 is a side view of a preferred embodiment of a take-up spool.
FIG. 19 is an end view of a preferred embodiment of the take-up spool of FIG. 18.
Figure 20:
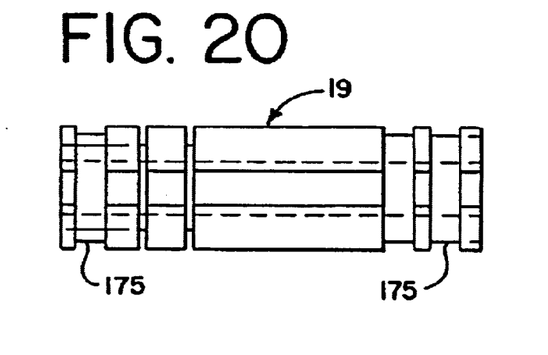
FIG. 20 is a side view of a preferred embodiment of a tab reel spindle.
Figure 21:
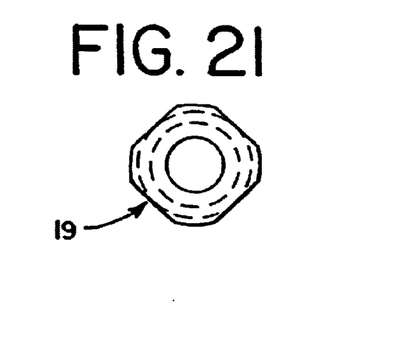
FIG. 21 is an end view of the tab reel spindle of FIG. 20.

Referring to FIGS. 1–3, and 5, the tab dispensing assembly 118 may preferably include a tab dispensing mounting frame 21 having a tab reel spindle post 55 mounted thereto, a tab reel spindle 19, and tab reel and hub guides 56. The hub guides 56 retain a roll 80 of adhesive backed tabs 81 which are applied to backing paper 82. A typical roll may, for example, include 5000 tabs. The mounting frame 21 and spindle post 55 are preferably made of steel. The spindle 19 and hub guides 56 are preferably made of plastic. As shown in FIGS. 20, 21, the spindle 19 may preferably include at least one notch 175, which receives O-ring 129 (See FIG. 3). The roll of tabs 80 slide onto the spindle 19. The tab dispensing assembly 118 further includes a tab brake 130 comprising a tab reel brake link 57 rotatably attached to the mounting frame 21 and to a reel brake post 34 with a rotatable tab brake roller 58. In addition, the tab dispensing assembly 118 may preferably include a rotatably mounted backing tape take-up spool 20, spool guide posts 59 with guide spools 50, and a carrier drive shaft 23 with tab carrier friction drive roller 60. As shown in FIGS. 16–17, the tab carrier friction drive roller 60 may preferably be made, for example, with an aluminum core 145 and with a foam sleeve such as, for example, a neoprene sponge. The friction drive roller may have a length of 1.75 inches and a diameter of 1.25 inches. The brake link 57, bar post 34, tab brake roller 58, spool guide posts 59 and drive shaft 23 are preferably made of steel. As shown in FIGS. 11–13, the tab brake roller 58 may, for example, have a length of 2.10 inches, a diameter of 1.0 inch, and be made of $^{11}/_{8}$ inch aluminum. As shown in FIGS. 14–15, the brake link 57 may, for example, have a length of 5.50 inches, and a width of 0.75 inch, and an axis opening 156 spaced (center to center) 4.20 inches from tab brake roller opening 158. The center of the openings 156, 158 are positioned 0.25 inch from the side of the brake link 57. A grooved region or notch 155 may be positioned, for example, 0.364 inches from the adjacent end of the brake link 57, and receives O-ring 128. (See FIG. 3). The take-up spool 20 and guide spools 50 are preferably made of plastic. As shown in FIGS. 18, 19, the spindle 19 may have a length of 2.5 inches, a diameter of 1.0 inch and a groove 165 formed adjacent one end for receiving an O-ring belt 167 (See FIG. 3). The spindle also includes slit 166 to receive backing paper 82. The guide rollers 50 and friction drive roller 60 are positioned to provide a degree of wrap around the friction drive roller 60 which eliminates the need for a pressure roller. The degree of wrap is preferably at least about 60 degrees, but more preferably at least about 100–180 degrees around the friction drive roller 60. A preferred embodiment includes approximately a 180 degree wrap, that assures a positive drive. The friction drive roller 60 is driven by an electric motor 38a, a motor pulley 32a, a timing belt 53, and a tab drive pulley 37. The motor 38a may, for example, be a 24 Volt DC motor. The motor pulley 32a may be a 10T Motor Pulley and the tab drive pulley 37 may, be a 60T Tab Drive Pulley. Tab drive pulley 37 is connected to the carrier drive shaft 23. A tab peel plate 17 is also attached to the mounting frame 21 with mounting bar assembly 18 and to the guide mounting cross bar 27 with peel bar support 72. The peel support 72 aids in preventing bending of the tab peel plate 17. The peel plate 17, mounting bar assembly 18, peel bar support 72, and guide mounting cross bar 27 are preferably made of steel. A tab fold guide bracket 51 may also be removably fastened to the mounting bar assembly 18. The tab fold guide bracket 51 are preferably made of plastic.

Referring to FIG. 2, other features and components of the tabber apparatus 100 may, in the embodiment shown, preferably include bottom panel 1, combo pulley post 10, media drive idler post 13, LCD bracket 16, tab dispenser frame support bar 22, take-up spool drive pulley 24, feeder exit guide 26, tab drive bushing 28, dispenser shaft bracket 33, clutch spring 35, 755 RW Bumpers 39, Oilite bushing with flange 41, DC power jack assembly 42, back tape mounting post 43, rear panel 47, thumb screw 61, media guides 63, 64, media feed angle adjustment bracket 65, media feed guide 66, front panel 1, seperator 68, seperator frame 69, rubber bumpers 70, and exit tray 71.

Referring to FIG. 3, when electric motor 38a is activated, the belt 53 which is coupled, for example, at 6:1 to carrier shaft 23, rotates the friction drive roller 60. The wrapping of the backing paper 82 around the friction drive roller 60, combined with the tension in the backing paper 82 being provided by the take-up spool 20 which is driven by O-ring 125, provides a positive drive. It takes, for example, 100 degrees of rotation of 1.25 inch friction drive roller 60 to achieve the dispensing of one tab 81, which is a pitch of about 1.1 inch. To assure proper tension in the backing paper 82 wrapped around the friction drive roller 60, the take-up spool 20 is rotated more than one pitch. The tab peel plate 17 is a thin metal plate with a rounded edge. The action of the backing paper 82 being pulled around the radius of the edge of the tab peel plate 17 causes the tab 81 to peel from the packing paper 82 and be positioned into the media path.

As shown in FIG. 3, as the friction drive roller 60 is rotated and the backing paper 82 is taken up on take-up spool 20, the tab brake roller 58 is rotated in the direction indicated by arrow 127 about axis point 126. Once the friction drive roller 60 stops rotating, the weight of the tab brake roller 58 rotates by its own weight in the direction opposite of the direction indicated by arrow 127 and thereby rotates spindle 19. The tab brake roller 58 is preferably rotatably attached to one end of the tab reel brake link 57 via the reel brake bar post 34. The grooved region 155 is preferably formed adjacent the other end of the brake link 57 to receive O-ring 128 which contacts with O-ring 129 positioned in groove 175 formed adjacent the end of tab reel spindle 19. The brake link 57 is preferably rotatably attached with, for example, a conventional fastener through opening 156 of the brake link 57 to the mounting frame 21. The opening 156 is offset from one end of the brake link 57 to provide sufficient length, and in combination with the weight of roller 58, sufficient force to stop the spindle 19 with tab roll 80 from rotating as the tab brake 130 returns to a first position 400 from a second position 402, which is above the first position 400. The weight of the tab brake roller 58 and length of the brake link 57 are also sufficient to allow the drive motor 38a to take-up the backing paper 82 and efficiently rotate the tab brake 130 from a first position 400 to a second position 402. The weight of the tab brake roller 58 and length of the brake link 57 are also sufficient to rotate the spindle 19 with tab roll 80 by applying force to the backing paper 82. Preferably, O-rings 128, 129 contact each other when the tab brake 130 is in the first position 400 and act to brake the spindle 19. The constant action of the tab brake 130 between positions 400 and 402 provides a constant load to the drive motor 38a, which would otherwise be changing based on the number of tabs remaining on the roll 80.

Figure 22:
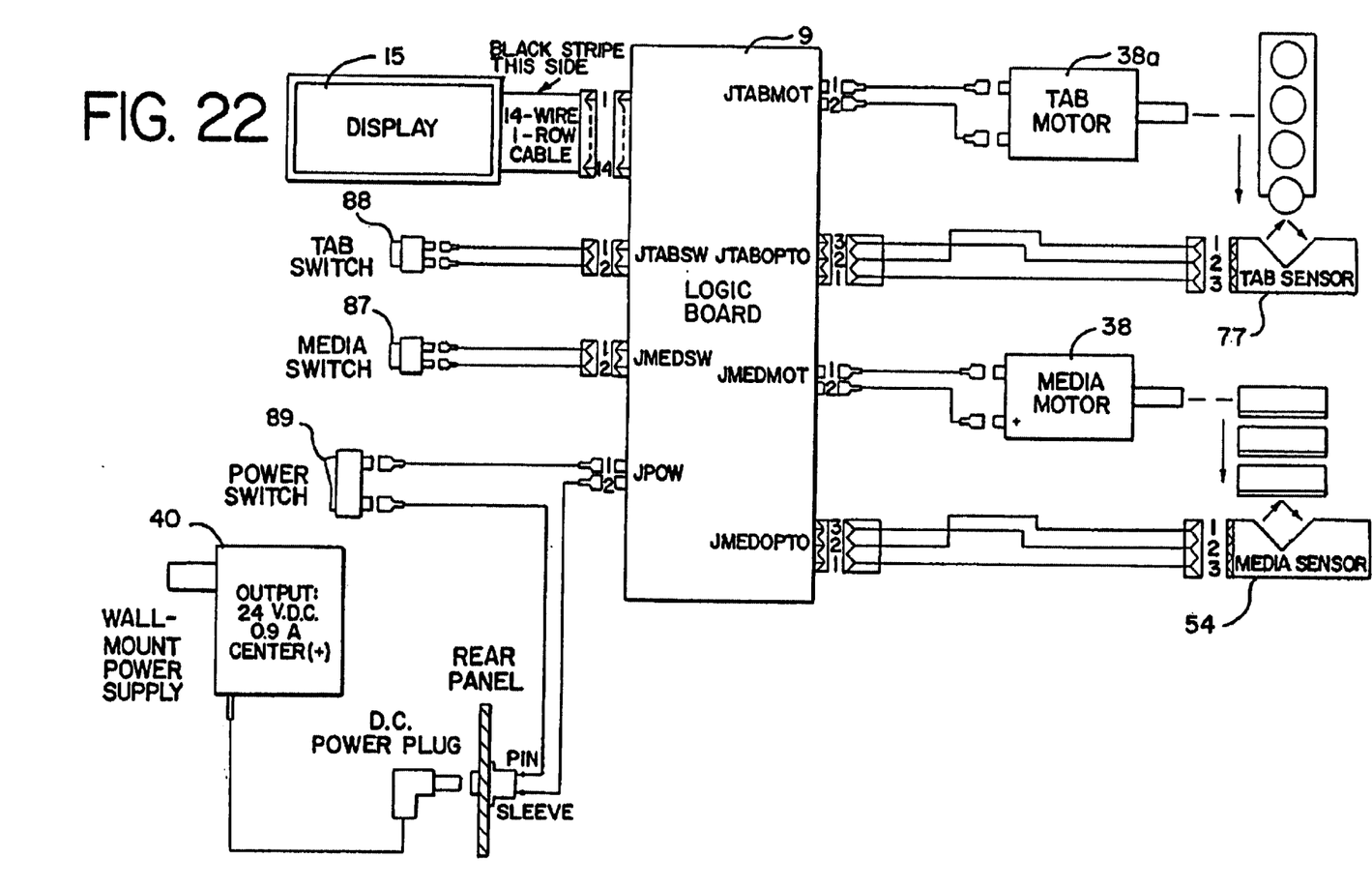
FIG. 22 is a wiring diagram for a preferred embodiment of the tabber apparatus.
Figure 23:
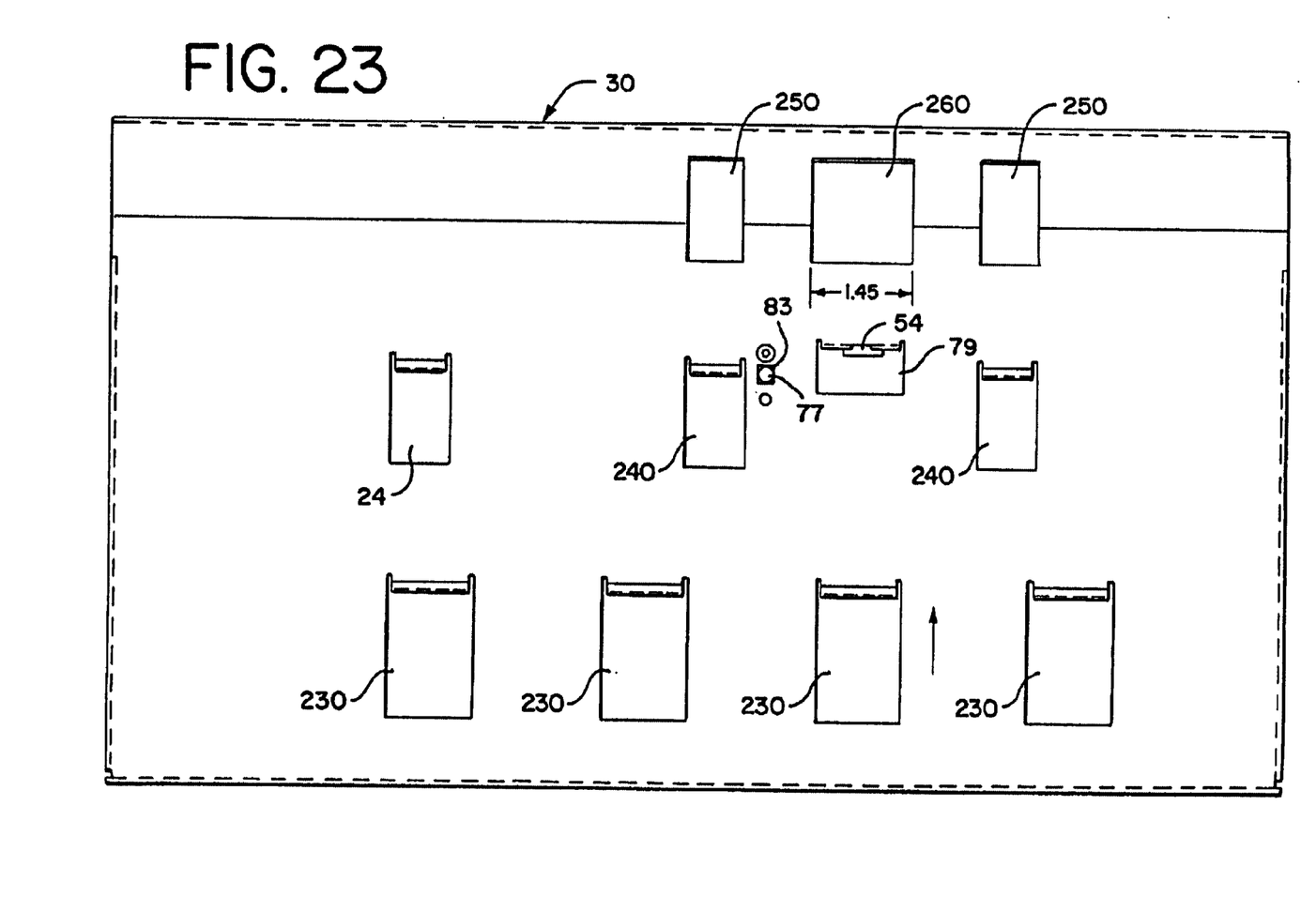
FIG. 23 is a plan view of a preferred embodiment of the top panel showing the media sensor opening and tab dispenser sensor opening.

Referring to FIGS. 1, 22 and 23, a tab dispenser sensor 77 is electrically connected to the main logic board 9, and mounted inside the housing 116 adjacent a tab dispenser sensor opening 79 formed in the top panel 130. (See FIG. 23). A DC power supply 40 supplies power to the tabber apparatus 100. The tab dispenser sensor 77 is preferably a reflective, modulated, phase locked, filtered beam optical sensor. The main logic board 9 includes a microcontroller 78 which receives a signal from the tab dispenser sensor 77 when the edge of the partially peeled tab 81 blocks the tab dispenser sensor 77. The main logic board 9 preferably includes a motor driver 101 operatively connected to the microcontroller 78. The main logic board 9 may also preferably include electrically erasable programmable read only memory (EEPROM) 99 operatively connected to the microcontroller 78.

The microcontroller 78 sends a signal to the motor driver 101 that electronically deactivates or electronically brakes the motor 38a to end the rotation of the friction drive roller 60. Electronic braking uses electromagnetic force to slow down and turn off the motor very rapidly. The tab dispenser sensor 77 preferably uses a modulated architecture to pulse infrared LED and gate on a phototransistor only when the phototransistor detects that the pulsed source (the tab 81) is present. The tab dispenser sensor 77 also preferably includes a narrow band width filter to improve the signal to noise ratio, which allows the tab dispenser sensor 77 to be mounted in a position which faces ambient light sources. As shown in FIGS. 2 and 3, the tab dispenser sensor 77 is faced toward the partially peeled tab 81. The tab dispenser sensor 77 detects the presence of the tab 81 when it is partially peeled, for example, 25% peeled. The remainder of the peeling action is controlled electronically. There is a time delay of, for example, 10–15 milliseconds when the motor 38a is deactivated by a signal from the microcontroller 78. The precise amount of peel may be programmed on (EEPROM) 99 which is operatively connected to the microcontroller 78 by a user by incrementing or decrementing, for example, in ¼ msec second intervals. The set points are indicated on a liquid crystal display (LCD) 15. Adjustment to the tab dispensing assembly 118 may be necessary to achieve a tab centered on the open edge of the form 90. Adjustments may be necessary or desired, for example, due to the size, shape, age or other physical characteristics of the tabs 81, and the thickness of the form 90.

Referring to FIGS. 1 and 2, a media sensor 54 is positioned beneath media sensor opening 83. Preferably, as shown in FIGS. 2, 3 and 23, the media sensor 54 is positioned adjacent the media sensor opening 83 in a position up stream of the tab dispenser sensor 77. As shown in FIG. 23, the feed rollers 5 are positioned in openings 230. The drive rollers 6 connected to drive shaft 45 are positioned in openings 240. The drive rollers 6 attached to exit shaft 44 are positioned in openings 250, and the tab drive roller 7 is positioned in opening 200. The media sensor 54 is also preferably a reflective, modulated, phase locked, filtered beam, optical sensor. The media sensor 54 senses the leading edge of the media feeding past a tab dispense center region, and over opening 83. This opening 83 will be blocked from a time just prior to the time the vertical standing tab 81 a has been removed, until the trailing edge of the media clears the opening 83 and media sensor view. During that period of time, no tab can be dispensed, because upon detection of the leading edge of the media or form 90, the media sensor 54 sends a signal to the microcontroller 78 which electronically prevents activation of the motor 38a until the trailing edge of the media has cleared the view of the media sensor 54. The media sensor 54 provides the microcontroller 78 with signals so that the time gap in the unblocked state and the time gap in the blocked state can be measured.

For the embodiment shown, for example, the approximate tab dispensing rate is 65msec per tab, which is the time required to accelerate and brake the motor 38a and tab dispensing assembly 118. Accordingly, for this example, a minimum gap of 65 msec would be required between the leading edges of adjacent media 90 to dispense each tab 81. A pre-dispenser cycle, which occurs while the media 90 blocks the media sensor 54, reduces this minimum gap. If the next media appears before the tab sensor is blocked, an error has occurred.

The LCD 15 is used to provide status information on the feed and tab systems. For example, a 2 line by 16 line character LCD may be used to provide a 4 digit batch counter or a six digit audit non-volatile counter. The LCD 15 provides status information on the feeder, the media and tab systems, and any error conditions. The LCD also facilitates programming of the peel adjustment.

Two momentary switches 87, 88 allow the user to start and stop the media and tab dispenser drives. A maintained position SPST rocker switch 89 is used to control the DC power to the tabber apparatus 100.

The media sensor 54 is positioned in front of the tab dispensing sensor 77. Accordingly, in operation, the leading edge of the form 90 will first block the media sensor 54 for a period of time (for example, 40–50 msec) before it strikes the tab 81. The leading edge then strikes the vertically positioned tab and moves the tab 81a away from the tab sensor 77, causing the tab sensor 77 to become unblocked (possibly only momentarily due to reflection from the media 90 passing over the top of the tab sensor 77).

Figure 6:
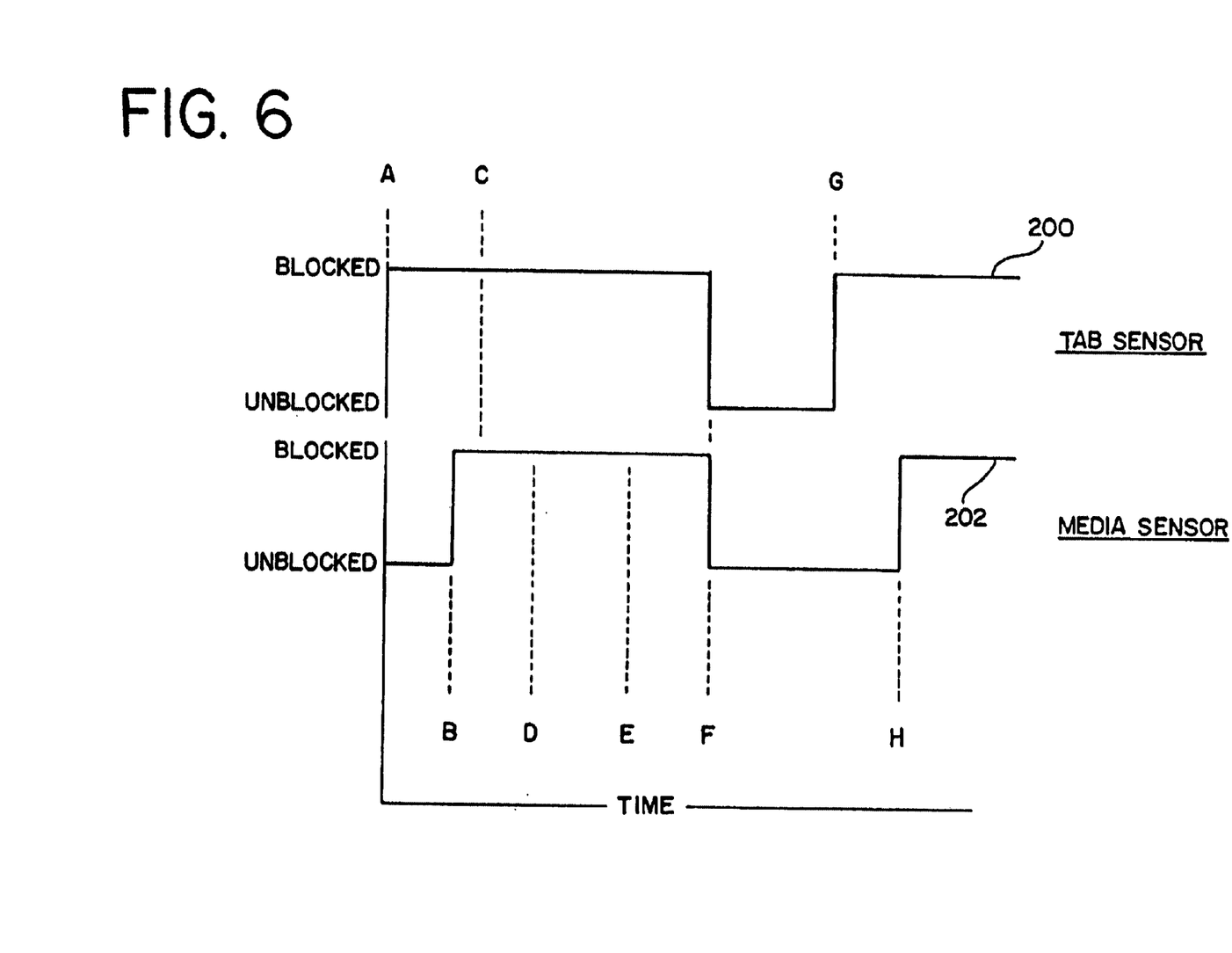
FIG. 6 is a waveform diagram showing a preferred embodiment of the sequencing of the tabbing process.
Figure 7:
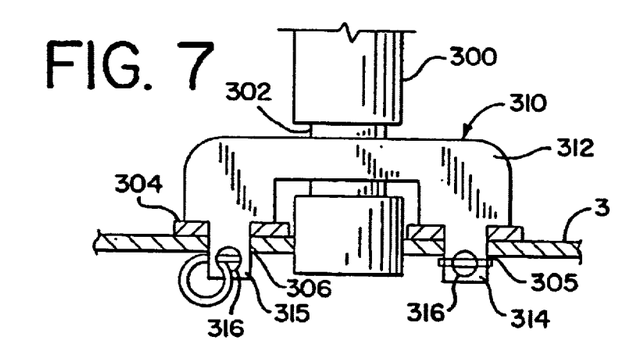
FIG. 7 is a plan view of a preferred embodiment of a retaining member and pressure roller shown in operating position.
Figure 8:
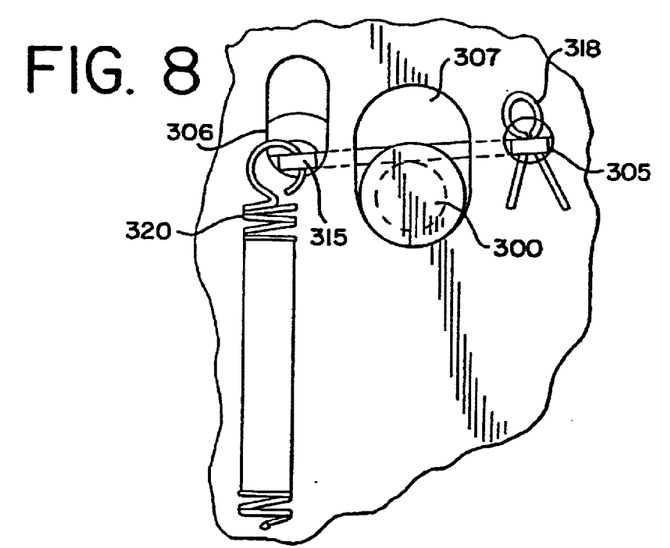
FIG. 8 is an end view of the retaining member of FIG. 7.
Figure 9:
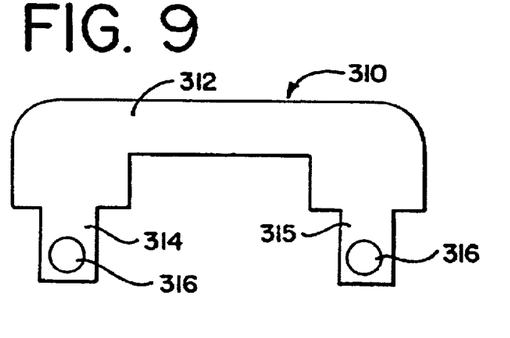
FIG. 9 is a plan view of the retaining member of FIG. 7.
Figure 10:
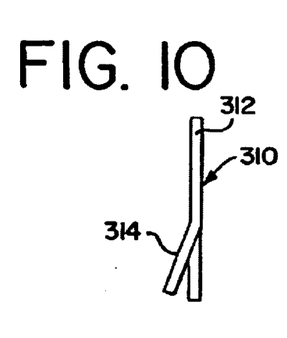
FIG. 10 is a side view of a retaining member including a 20 degree bend.

Referring to FIG. 6, the waveform timing diagram for the tab sensor 200 and media sensor 202 shows an example of the sequencing of the tabbing process. The far left side of the diagram (position A) illustrates a point in time when a tab (Tab #1) is completely dispensed and is blocking tab dispensing sensor 77. At position A, a first form (Media #1) is being fed towards Tab #1 but is not yet blocking the media sensor 54. As Media #1 is advanced toward Tab #1, the leading edge of Media #1 blocks the media sensor (position B). At position B, the media sensor sends a signal to the microcontroller 78 which starts a delay timer, which may be included as firmware on the microcontroller 78. After a period of time lapses, the delay timer will start the pre-dispense cycle. Media #1 continues to be advanced and pulls Tab #1 clear of the tab dispensing sensor 77 (position C). The light reflected from Media #1, however, continues to block the tab dispensing sensor 77. Once the timer delay is completed, the pre-dispense cycle starts (position D). At position D, the microcontroller 78 sends a command signal to motor driver 101 to start the tab motor 38a, and starts the timer for the pre-dispense cycle. The backing paper 82 is taken up through rotation of the friction drive roller 60. Tab #2 is partially peeled from the backing paper 82 and is suspended above Media #1. Once the time sequence for the pre-dispense cycle expires, the microcontroller 78 sends a command signal to turn off or electronically brake the tab motor 38a (position E). Media #1 unblocks both the tab sensor 77 and the media sensor 54 (position F). At position F, the sensors send signals to the microcontroller 78, which initiates the start of Tab #2 dispense cycle, by sending a command signal to turn on tab motor 38a and start the timer for the dispense cycle. As Tab #2 brakes the plane of the top panel 30, the tab sensor 77 is blocked and the tab sensor 77 sends a signal to the microcontroller 78, which sends a command signal to the motor driver 101 to shut off or electronically brake the motor 38a (position G). At position G, Tab #2 is fully dispensed. As a second form (Media #2) is advanced toward Tab #2 the media sensor 54 is again blocked, by the leading edge of Media #2, thus starting the next cycle.

As shown in FIGS. 7–10, each of the pressure roller shafts 300, which include the upper mid-shaft 4 and upper exit shaft 36, preferably include a recessed area or notch 302 formed adjacent at least one end and preferably both ends of the shaft 300, to receive a retaining member 310 (which are shown in FIG. 2, as retaining members 8, 52). The retaining member 310 includes a body portion 312 and arm portions 314, 315. The arm portions 314, 315 are sized to fit through a pair of openings 305, 306 formed in both the right and left side panels 2, 3 of the frame. The retaining member 310 is preferably a thin flat member as shown, and may be made of, for example, steel or other suitable material. The arm portions 314, 315 each include an opening 316 formed therein. As shown, arm portion 314 receives a locking pin 318. An extension spring 320 may be attached at one end to the frame or panel, and at the other end to the opening 316 in arm portion 315. Alternatively, a second locking pin 318 may be fitted in opening 316 of arm portion 315 and, the spring 320 attached to the opening in the locking pin. The spring may be attached in any other suitable manner to bias the retaining member 310 against the shaft 300. Any other means of biasing the arm portion 315 may alternatively be used. The arm portion 315, which fits in opening 306, may be rotated about arm 314 to allow insertion of the pressure roller shaft 300 in slot 307. The opening 306 is preferably a slot sized to allow sufficient rotation of arm 315 for insertion of shaft 300. Accordingly, the shaft 300 is captive in all other planes except for the vertical plane where the shaft 300 may move up and down as various media thicknesses are encountered. The shaft 300 may be released if the retaining member 310 is lifted the distance of the thickest media, so that the pressure roller shaft 300 may be displaced axially to be removed. This provides the operator with a quick way of clearing the operating area to remove any jams which may occur.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

I claim:

1. A tabber apparatus for affixing tabs, the tabs being disposed on backing paper, comprising:

a frame;

a tab reel spindle rotatably connected to the frame;

a peel plate operably receiving the backing paper from the tab reel spindle; and a brake member including a brake link rotatably attached to the frame at an axis point, and a roller rotatably attached to the brake link, wherein the roller is rotated from a first position to a second position about the axis point when one of the tabs is dispensed, and the roller returns to the first position pulling the backing paper from the tab reel spindle after the one of the tabs is dispensed.

2. The apparatus of claim 1 further comprising:

a brake link O-ring positioned around the brake link adjacent an end of the brake link to allow the brake link O-ring to press against the spindle when in the first position.

3. The apparatus of claim 2 further comprising:

a spindle O-ring positioned around the spindle, the spindle O-ring in contact with the brake link O-ring when in the first position.

4. The apparatus of claim 1 wherein the brake link has a length, and the roller has a weight, to allow the brake member to stop the spindle from rotating when the roller is in the first position, and to rotate the spindle when rotating the roller from the second position to the first position.

5. The apparatus of claim 1 wherein the first position is lower than the second position.

6. The apparatus of claim 1 wherein the tabs are disposed on the backing paper at a regular pitch, and the first position and the second position are offset by a distance of translation defined by advancing the backing paper by the regular pitch at the peel plate.

7. A method of operating a tabber apparatus for affixing tabs, the tabs being disposed on backing paper, comprising:

providing a frame, a tab reel spindle rotatably connected to the frame, a peel plate operably receiving the backing paper from the tab reel spindle, a brake member including a brake link rotatably attached to the frame at an axis point, and a roller rotatably attached to the brake link;

rotating the brake member about the axis to move the roller from a first position to a second position when a tab is dispensed;

rotating the brake member to move the roller back to the second position; and pulling the backing paper from the tab reel spindle with the roller as the roller moves from the second position to the first position.

8. The method of claim 7 further comprising:
pressing a first end of the link against the spindle when the roller is in the first position to stop rotation of the spindle.

9. The method of claim 7 further comprising:
providing a first O-ring positioned around the brake link, providing a second O-ring positioned around the spindle; and contacting the first and second O-rings to stop the spindle from rotating when the roller is in the first position.

10. The method of claim 7 wherein the tabs are disposed on the backing paper at a regular pitch, and the first position and the second position are offset by a distance of translation defined by advancing the backing paper by the regular pitch at the peel plate.

* * * * *